(12) United States Patent
Lee et al.

(10) Patent No.: US 10,339,354 B2
(45) Date of Patent: Jul. 2, 2019

(54) WEARABLE DEVICE AND CONTROLLING METHOD THEREOF

(71) Applicant: LG ELECTRONICS INC., Seoul (KR)

(72) Inventors: Junhak Lee, Seoul (KR); Hyungchul Won, Seoul (KR); Chaedeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 15/581,657

(22) Filed: Apr. 28, 2017

(65) Prior Publication Data

US 2017/0323141 A1 Nov. 9, 2017

(30) Foreign Application Priority Data

May 4, 2016 (KR) .......................... 10-2016-0055443

(51) Int. Cl.
*G06K 9/00* (2006.01)
*G06K 9/20* (2006.01)

(52) U.S. Cl.
CPC ....... *G06K 9/00013* (2013.01); *G06K 9/2027* (2013.01); *G06K 9/00087* (2013.01)

(58) Field of Classification Search
CPC ............ G06K 9/00013; G06K 9/2027; G06K 9/00087
See application file for complete search history.

(56) References Cited

U.S. PATENT DOCUMENTS

| 8,811,682 | B2 | 8/2014 | Kanda et al. |
| 2009/0028396 | A1 | 1/2009 | Kishima |
| 2014/0196131 | A1 | 7/2014 | Lee |
| 2014/0301610 | A1 | 10/2014 | Takiguchi |
| 2016/0084869 | A1* | 3/2016 | Yuen ........................ G01P 7/00 73/510 |
| 2016/0117563 | A1 | 4/2016 | Shin et al. |

\* cited by examiner

*Primary Examiner* — Phuoc Tran

(74) *Attorney, Agent, or Firm* — Birch, Stewart, Kolasch & Birch, LLP

(57) ABSTRACT

Disclosed are a wearable device and controlling method thereof. The present invention includes a flexible surface light source, a photo panel located on a top surface of the flexible surface light source, and a controller coupled with the flexible surface light source and the photo panel. The controller is configured to detect a first biometric image by controlling the flexible surface light source and identify a user by comparing the detected first biometric image to a second biometric image previously saved in a memory.

8 Claims, 8 Drawing Sheets

WEARABLE DEVICE AND CONTROLLING METHOD THEREOF

Pursuant to 35 U.S.C. § 119(a), this application claims the benefit of earlier filing date and right of priority to Korean Application No. 10-2016-0055443, filed on May 4, 2016, the contents of which are hereby incorporated by reference herein in their entirety.

BACKGROUND OF THE INVENTION

Field of the Invention

The present invention relates to a wearable device, and more particularly, to a wearable device and controlling method thereof. Although the present invention is suitable for a wide scope of applications, it is particularly suitable for enabling user authentication in a manner of obtaining user's biometric image using a flexible surface light source and a photo panel.

Discussion of the Related Art

Generally, the object of the vein authentication technology is to obtain vein blood vessel information differing for each person. Such a technology can identify a person in a manner of applying infrared ray of a specific wavelength, photographing with an image sensor, and then extracting a blood vessel pattern represented in black.

Since the vein authentication technology is not exposed to the risk of loss and has responsiveness to the risk of a hacking attempt, it has become a field in the spotlight recently.

Owing to high anti-forgery level, low false acceptance rate (FAR), low FRR (false rejection rate) and low FER (failure to enroll rate), the vein authentication technology applies to a high security field (e.g., national defense, public office, bank, etc.). And, application of the vein authentication technology to general fields is actively considered owing to accuracy higher than that of the fingerprint technology.

Vein authentication of the related art identifies or distinguishes a person through a non-contact sensing g of a finger vein.

Since the vein authentication technology of the related art uses an image sensor and an optical system, an image is taken by leaving a predetermined distance. And, the vein authentication technology has a limitation put on downsizing a sensor module due to restrictions put on an imaging device and a light source disposition.

Moreover, since the vein authentication of the related art depends on a non-contact sensing, it has difficulty in being installed on a mobile device or the like. Specifically, if the related art applies to a wearable device configured to come into contact with user's body, there is a problem that the user should space the wearable device apart from the user's body over a predetermined distance for the vein authentication.

In order to overcome the above problems and enhance user convenience by installation on a mobile device or the like, the demand for a device capable of detecting a vein image in the course of a contact between a user's body and a sensor is rising.

SUMMARY OF THE INVENTION

Accordingly, embodiments of the present invention are directed to a wearable device and controlling method thereof that substantially obviate one or more problems due to limitations and disadvantages of the related art.

One object of the present invention is to provide a wearable device and controlling method thereof, by which biometric authentication can be performed further quickly and accurately.

Another object of the present invention is to provide a wearable device and controlling method thereof, by which vein authentication is performed in a contact manner.

Further object of the present invention is to provide a wearable device and controlling method thereof, by which the wearable device capable of performing a vein authentication process can be downsized.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a wearable device according to one embodiment of the present invention may include a flexible surface light source, a photo panel located on a top surface of the flexible surface light source, and a controller coupled with the flexible surface light source and the photo panel.

Herein, the controller may be configured to detect a first biometric image by controlling the flexible surface light source and identify a user by comparing the detected first biometric image to a second biometric image previously saved to a memory.

Preferably, the first biometric image may be detected in a state that the photo panel and one of body parts of the user come into contact with each other directly or indirectly.

Preferably, the flexible surface light source may include at least one or more infrared or white light projection units arranged sequentially and a reflective unit located on one side of the flexible surface light source in a direction in parallel with the flexible surface light source to project at least one of an infrared light and a white light in a direction vertical to the flexible surface light source, wherein the flexible surface light source may be configured to selectively project at least one of the infrared light and the white light under a control of the controller.

More preferably, the controller may control the flexible surface light source to project the infrared light to obtain a vein image, and may control the flexible surface light source to project the white light to obtain a fingerprint image or a palm image.

More preferably, the photo panel may include a first photo panel located on the top surface of the flexible surface light source and a second photo panel located on a bottom surface of the flexible surface light source and the first photo panel, the flexible surface light source and the second photo panel may be stacked in order.

Herein, the controller may control the flexible surface light source to project the infrared light and the white light together and the photo panel may obtains a vein image through the first photo panel and also obtain a fingerprint image or a palm image through the second photo panel.

Preferably, the wearable device may include a band configured to be worn on a wrist of the user and the photo panel may detect a 3D vein image under the control of the controller in a manner that the flexible surface light source and the photo panel are provided along an inner surface of the band.

Preferably, the controller may be configured to require either a vein image or both of the vein image and a fingerprint image according to a security level required per function of the wearable device.

Preferably, the wearable device may include a ring and the photo panel may include a TFT panel.

Accordingly, embodiments of the present invention provide various effects and/or features.

First of all, as the IoT (Internet of Things) age has come, the biometric authentication has been actively developed as well. Hence, the number of biometric information collecting devices of band or watch types is increasing.

Since the related art recognition technologies of iris, fingerprint, finger vein, hand back and the like depend on the non-contact sensing, a user should space a device apart from user's body over a predetermined distance. On the contrary, in a wearable device and controlling method thereof according to one embodiment of the present invention, a biometric image is detected in a contact manner. Therefore, the wearable device can be downsized and the user authentication can be performed quickly and conveniently.

Moreover, since a wearable device according to another embodiment of the present invention is embodied into a band or watch type for example, a nonintrusive/unconstrained user authentication can be performed.

Effects obtainable from the present invention may be non-limited by the above mentioned effects. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
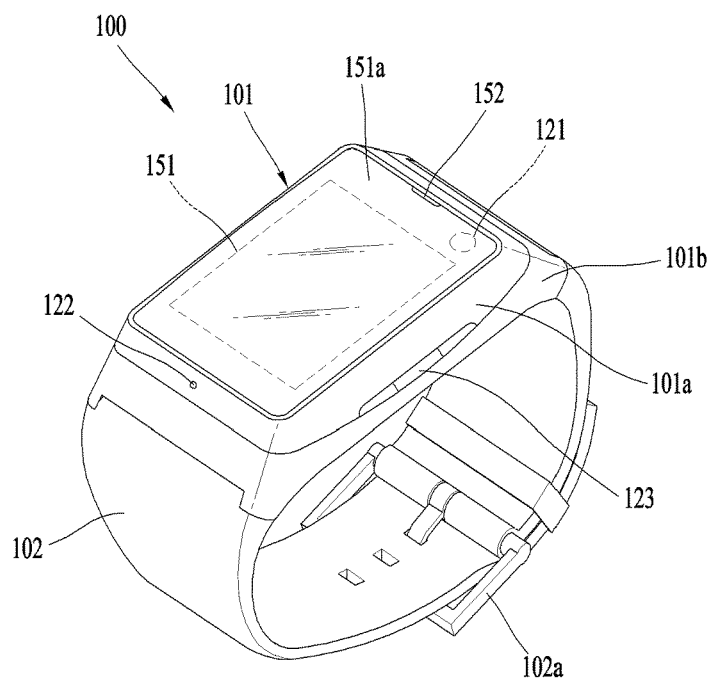
FIG. 1 is a conceptual view of a wearable mobile terminal according to another alternative embodiment of the present disclosure.

FIG. 1 is a perspective view illustrating one example of a watch-type mobile terminal 100 in accordance with another exemplary embodiment. As illustrated in FIG. 1, the watch-type mobile terminal 100 includes a main body 101 with a display unit 151 and a band 102 connected to the main body 101 to be wearable on a wrist. The main body 101 may include a case having a certain appearance. As illustrated, the case may include a first case 101a and a second case 101b cooperatively defining an inner space for accommodating various electronic components. Other configurations are possible. For instance, a single case may alternatively be implemented, with such a case being configured to define the inner space, thereby implementing a mobile terminal 100 with a uni-body.

The watch-type mobile terminal 100 can perform wireless communication, and an antenna for the wireless communication can be installed in the main body 101. The antenna may extend its function using the case. For example, a case including a conductive material may be electrically connected to the antenna to extend a ground area or a radiation area.

The display unit 151 is shown located at the front side of the main body 101 so that displayed information is viewable to a user. In some embodiments, the display unit 151 includes a touch sensor so that the display unit can function as a touch screen. As illustrated, window 151a is positioned on the first case 101a to form a front surface of the terminal body together with the first case 101a.

The illustrated embodiment includes audio output module 152, a camera 121, a microphone 122, and a user input unit 123 positioned on the main body 101. When the display unit 151 is implemented as a touch screen, additional function keys may be minimized or eliminated. For example, when the touch screen is implemented, the user input unit 123 may be omitted.

The band 102 is commonly worn on the user's wrist and may be made of a flexible material for facilitating wearing of the device. As one example, the band 102 may be made of fur, rubber, silicon, synthetic resin, or the like. The band 102 may also be configured to be detachable from the main body 101. Accordingly, the band 102 may be replaceable with various types of bands according to a user's preference.

In one configuration, the band 102 may be used for extending the performance of the antenna. For example, the band may include therein a ground extending portion (not shown) electrically connected to the antenna to extend a ground area.

The band 102 may include fastener 102a. The fastener 102a may be implemented into a buckle type, a snap-fit hook structure, a Velcro® type, or the like, and include a flexible section or material. The drawing illustrates an example that the fastener 102a is implemented using a buckle.

Figure 2:
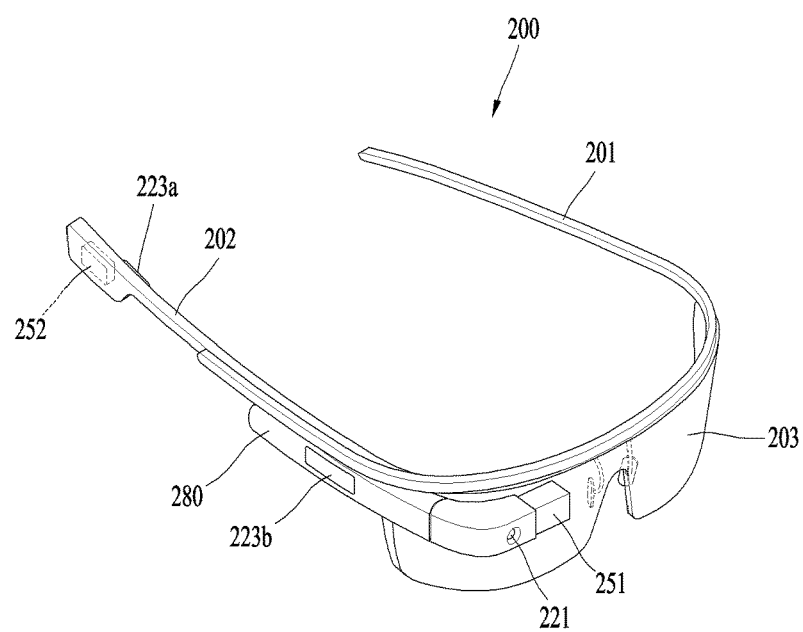
FIG. 2 is a conceptual view of a wearable mobile terminal according to another alternative embodiment of the present disclosure.

FIG. 2 is a perspective view illustrating one example of a glass-type mobile terminal 200 according to another exemplary embodiment. The glass-type mobile terminal 200 can be wearable on a head of a human body and provided with a frame (case, housing, etc.) therefor. The frame may be made of a flexible material to be easily worn. The frame of mobile terminal 200 is shown having a first frame 201 and a second frame 202, which can be made of the same or different materials.

The frame may be supported on the head and defines a space for mounting various components. As illustrated, electronic components, such as a control module 280, an audio output module 252, and the like, may be mounted to the frame part. Also, a lens 203 for covering either or both of the left and right eyes may be detachably coupled to the frame part.

The control module 280 controls various electronic components disposed in the mobile terminal 200. FIG. 2 illustrates that the control module 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user.

In such a manner, the image output through the display unit 251 may be viewed while overlapping with the general visual field. The mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing. The camera 221 may be positioned at most any location of the mobile terminal. In some embodiments, multiple cameras 221 may be utilized. Such multiple cameras 221 may be used to acquire a stereoscopic image.

The glass-type mobile terminal 200 may include user input units 223a and 223b, which can each be manipulated by the user to provide an input. The user input units 223a and 223b may employ techniques which permit input via a tactile input. Typical tactile inputs include a touch, push, or the like. The user input units 223a and 223b are shown operable in a pushing manner and a touching manner as they are located on the frame part and the control module 280, respectively.

If desired, mobile terminal 200 may include a microphone which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the mobile terminal 200 and vibrate the user's skull to transfer sounds.

Figure 3:
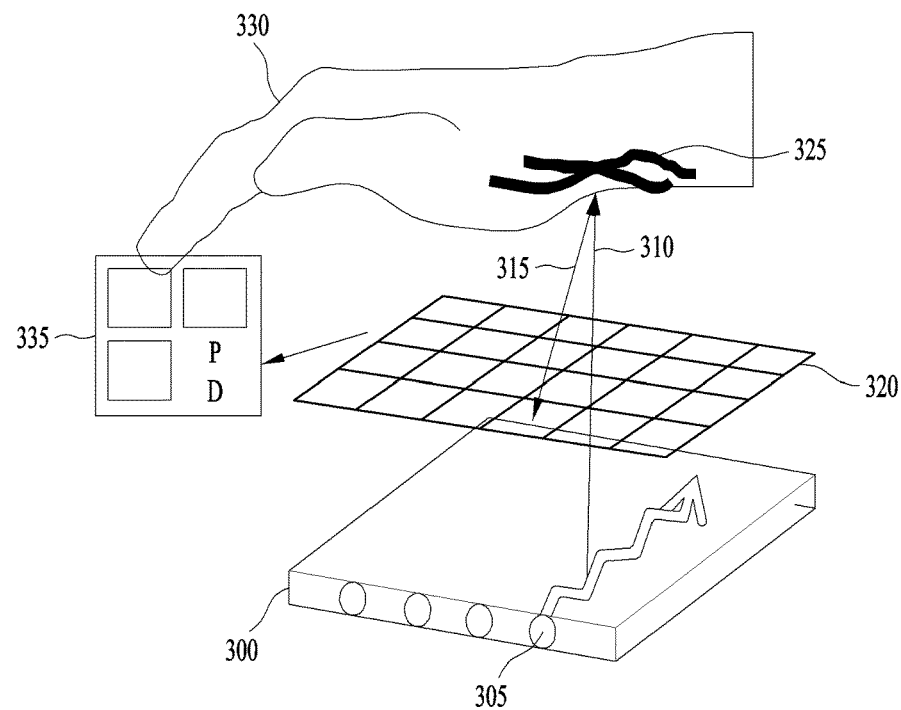
FIG. 3 is a diagram to show the principle for a wearable device according to one embodiment of the present invention to obtain user's biometric image.

FIG. 3 is a diagram to show the principle for a wearable device according to one embodiment of the present invention to obtain user's biometric image.

A process for a flexible surface light source and a photo panel to obtain user's biometric image is described in detail with reference to FIG. 3 as follows.

Referring to FIG. 3, a wearable device according to one embodiment of the present invention includes a flexible surface light source 300, a light projection unit 305 and a photo panel 320.

The flexible surface light source 300 may include a plurality of light projection units 305 of an LCD (liquid crystal display) type and reflective unit (not shown) for example. The reflective unit may be located on one side of the flexible surface light source 300 in a direction in parallel with the flexible surface light source 300 so that light can be projected in a direction vertical to the flexible surface light source 300.

Alternatively the flexible surface light source 300 of OLED (organic light emitting diode) type can be included, which belongs to the scope of the appended claims and their equivalents.

The photo panel 320 is configured with a TFT (thin film transistor) photo panel of an active type and obtains a signal by a unit of cell 335 of the TFT photo panel.

Alternatively, the photo panel 320 can be included as a photo panel of a passive type to obtain a signal in a Line-by-Line manner, which belongs to the scope of the appended claims and their equivalents.

Although FIG. 3 shows that the flexible surface light source 300 and the photo panel 320 are separated from each other for clarity of the description, the photo panel 320 may be preferably located right over a top side of the flexible surface light source 300. The reason for this is that the photo panel 320 can accurately detect a biometric image when a surface reflection of a projected light 310 is minimized in a manner that the flexible surface light source 300 adheres to a user's body 330 as close as possible.

As the wearable device according to one embodiment of the present invention obtains user's biometric image in a state that the user's body 330 touches a biometric authentication device, an image is obtained in a state that the user's body 330 directly comes into contact with the photo panel 320. Yet, in case that a prescribed gap (between 0~0.5 mm by text), a biometric image can be obtained. And, one embodiment of obtaining a biometric image under the prescribed gap belongs to the scope of the appended claims and their equivalents. Moreover, a protective panel (not shown) may be separately provided between the photo panel 320 and the user's body 330.

Since a biometric authentication device of the related art performs authentication in a manner of taking an image by leaving a predetermined distance in-between, it causes a problem that a user should take off a wearable device in order to progress an authentication process. This is clearly distinguished from a contact-type photographing or an ultra-proximity type photographing according to one embodiment of the present invention.

In the following, a process for the projected light 310 to arrive at the photo panel 320 by reflecting from the user's body 330 is described.

First of all, the light 310 projected in a direction vertical to the flexible surface light source 300 arrives at the user's body 330. As hemoglobin existing in a user's vein 325 absorbs light on a predetermined wavelength region, the reflecting light 315 that is not absorbed is detected by the photo panel 320. Namely, user's blood vessel pattern information is collected by the photo panel 320.

Meanwhile, the wearable device according to one embodiment of the present invention can be embodied into the glass-type mobile terminal 200 shown in FIG. 2.

Since the flexible surface light source 300 and the photo panel 320 can be downsized and slimmed, they can operated by being provided to the first or second frame 201 or 202 of the glass-type mobile terminal 200 shown in FIG. 2. Namely, they can detect a body image of a user touching the first frame 201 or the second frame 202 in a manner of being installed on a head part of a human body.

Meanwhile, the wearable device according to one embodiment of the present invention can be embodied into a ring-type mobile terminal.

Since the flexible surface light source 300 and the photo panel 320 can be downsized and slimmed, they can be provided to an inner surface of a ring. Hence, a vein image of a finger and the like can be obtained while a user wears the ring.

Particularly, a controller coupled with the flexible surface light source 300 and the photo panel 320 can obtains a user's vein image by generating a synchronization drive signal when the ring-type wearable device is installed by completely adhering to user's finger.

Meanwhile, a biometric authentication device according to another embodiment of the present invention may obtain a user's biometric image not by the optical system shown in FIG. 3 but by an ultrasonic system.

Figure 4:
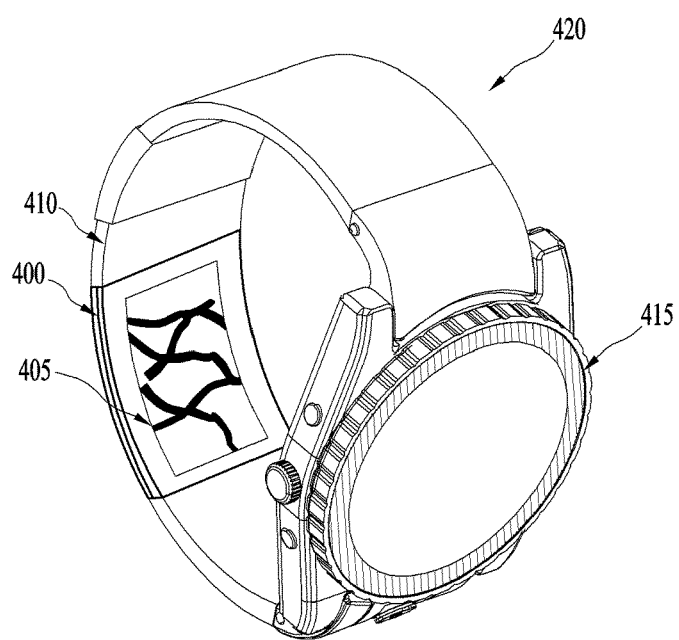
FIG. 4 is a perspective diagram of the wearable device shown in FIG. 3.

FIG. 4 is a perspective diagram of the wearable device shown in FIG. 3.

A band-type wearable device 420 shown in FIG. 4 may include the watch-type mobile terminal 100 shown in FIG. 1. For instance, a flexible surface light source 400 and a photo panel 405 are provided to an inner surface of a band 410. In order to operate together with the flexible surface light source 400, the photo panel 405 can be provided in flexible form.

A controller (not shown) coupled with the flexible surface light source 400 and the photo panel 405 may be provided to a main body 415 shown in FIG. 4, which performs the same function of the former main body 151 shown in FIG. 1.

As the flexible surface light source 400 and the photo panel 405 are provided to the inner surface of the band 410, if a user wears the band-type wearable device 420, user's biometric image can be detected.

In case that a user wears the band-type wearable device having a biometric authentication device applied thereto, a user's body always comes into contact with the biometric authentication device. Hence, in the course of performing a function of cost payment or the like through the wearable device, a nonintrusive authentication can be performed without a separate operation.

Figure 5:
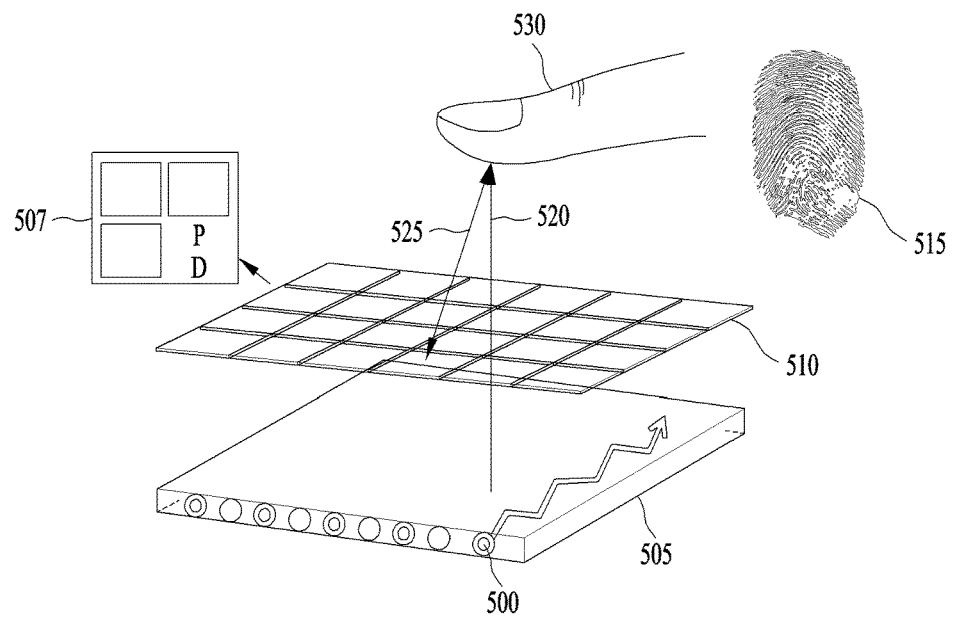
FIG. 5 is a diagram to show the principle for a wearable device according to another embodiment of the present invention to obtain user's fingerprint related image.
Figure 6:
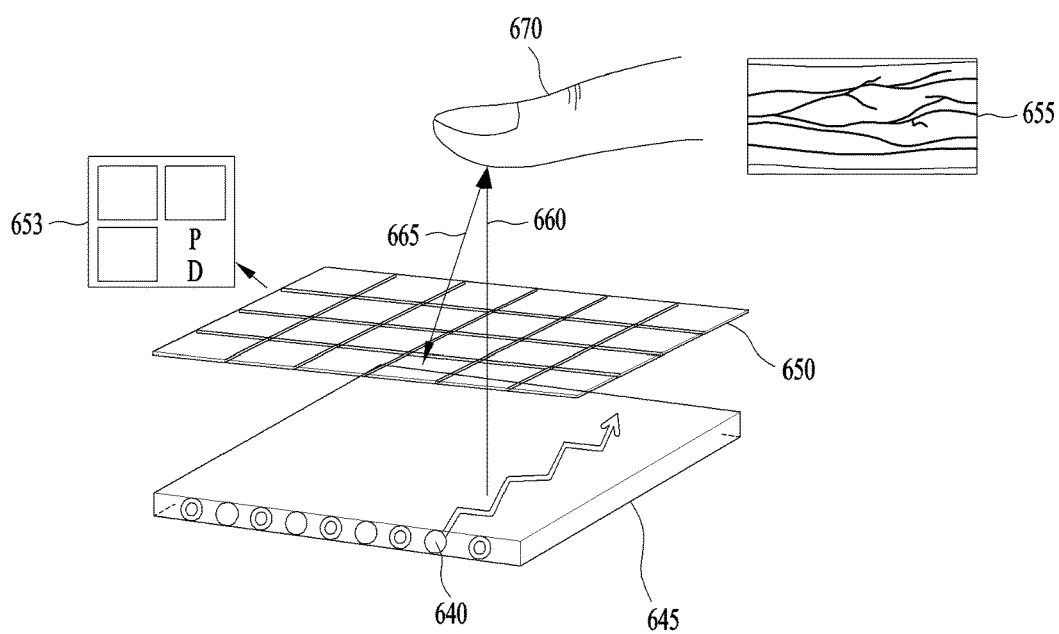
FIG. 6 is a diagram to show the principle for a wearable device according to another embodiment of the present invention to obtain user's vein related image.
Figure 7:
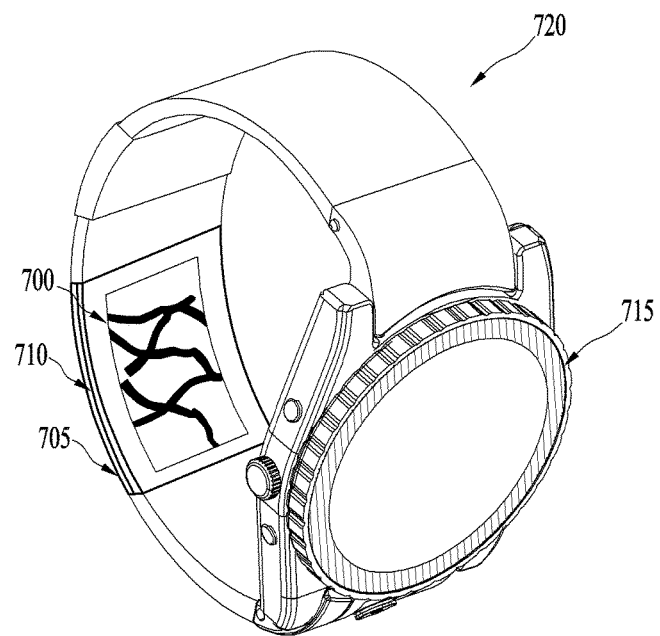
FIG. 7 is a perspective diagram of the wearable device shown in FIG. 5 or FIG. 6.

With reference to FIGS. 5 to 7, the principles for a wearable device according to another embodiment of the present invention, in which multimodality is implemented, to obtain a fingerprint or vein related image of a user are described as follows.

FIG. 5 is a diagram to show the principle for a wearable device according to another embodiment of the present invention to obtain user's fingerprint related image.

With reference to FIG. 5, a process for obtaining a fingerprint image 515 of a user to implement multimodality by projecting a white light 520 from a flexible surface light source 505 of the present invention is described.

Structures and dispositions of the flexible surface light source 505, a photo panel 510 and a cell 507 of the photo panel 510 can be understood through the former description with reference to FIG. 3.

A light projection unit 500 projects the white light 520 to operate in a mode for obtaining user's fingerprint image. In the white light 520, the light in at least one color of red, orange, yellow, green, blue, navy and violet can be included.

A white light 525 reflecting from a user's body 530 is detected by the photo panel 510. A detected biometric image of the user may include a portion of a vein image but may mainly include a fingerprint image 515 or a palm image of the user. In particular, the fingerprint image 515 of the user can be efficiently detected through the white light 525.

FIG. 6 is a diagram to show the principle for a wearable device according to another embodiment of the present invention to obtain user's vein related image.

With reference to FIG. 6, a process for obtaining a vein image 655 of a user to implement multimodality by projecting an infrared light 660 from a flexible surface light source 645 of the present invention is described.

Structures and dispositions of the flexible surface light source 645, a photo panel 650 and a cell 653 of the photo panel 650 can be understood through the former description with reference to FIG. 3.

A light projection unit 640 projects the infrared light 660 to operate in a mode for obtaining user's vein image. The infrared light 660 means the light having a wavelength ranging between 0.7~1,000 µm.

An infrared light 665 reflecting from a user's body 670 is detected by the photo panel 650. A detected biometric image of the user may include a vein image 655 of the user. The detected biometric image of the user may include a portion of a fingerprint image but may mainly include the vein image 655 of the user. In particular, the vein image 655 of the user can be efficiently detected through the infrared light 660.

Although FIG. 6 shows that the user's body 670 is a finger, one example of obtaining vein images of other body parts such as a wrist and the like can belong to the scope of the appended claims and their equivalents.

FIG. 7 is a perspective diagram of the wearable device shown in FIG. 5 or FIG. 6.

With reference to FIG. 7, a process for implementing multimodality by applying a flexible surface light source 710, a first photo panel 700 and a second photo panel 705 of the present invention to a band-type wearable device 720 is described as follows.

Both of the fingerprint image obtaining mode mentioned in FIG. 5 and the vein image obtaining mode mentioned in FIG. 6 are provided onto the band-type wearable device 720 together, whereby multimodality can be implemented.

With reference to the flexible surface light source 710, the first photo panel 700 is located on an inner surface of the band and the second photo panel 705 is located on an outer surface of the band.

A controller (not shown) coupled with the flexible surface light source 710, the first photo panel 700 and the second photo panel 705 may be provided to a main body 715 shown in FIG. 7, which performs the same function of the former main body 151 shown in FIG. 1.

Under the control of the controller, a light projection unit (not shown) of the flexible surface light source 710 selectively projects one of an infrared light and a white light, or may project both together.

While a user wears the band-type wearable device, the first photo panel 700 provided to the inner surface of the band can obtain a vein image. And, the second photo panel 705 can obtain a fingerprint image in a manner that a finger of a hand failing to have the device worn thereon is put on the second photo panel 705 provided to the outer surface of the band.

Since a biometric authentication device of the related art performs authentication in a manner of taking an image by leaving a predetermined distance in-between, it causes a problem that a user should take off a wearable device in order to progress an authentication process. This is clearly distinguished from a contact-type photographing or an ultra-proximity type photographing according to one embodiment of the present invention.

Regarding the wearable device according to another embodiment of the present invention, while a user wears the band-type wearable device, if the user applies a pressure to the second photo panel 705 provided to the outer surface of the band with a finger of a hand on which the device is not worn, the controller can generate a synchronization drive signal to detect both a fingerprint image and a vein image.

In particular, by applying a pressure to the second photo panel 705 with a finger of a hand having the device not worn thereon, a mode for detecting one of a fingerprint image and a vein image and a mode for detecting both a fingerprint image and a vein image can be switched to each other intuitively and easily.

Figure 8:
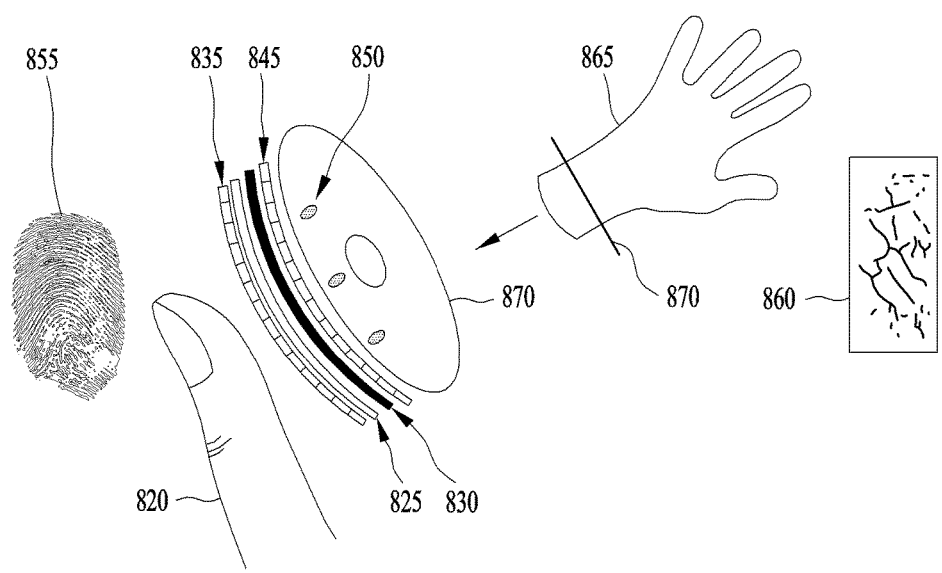
FIG. 8 is a diagram to describe a process for the wearable device shown in FIG. 5 or FIG. 6 to obtain both of the fingerprint related image and the vein related image of the user.

FIG. 8 is a diagram to describe a process for the wearable device shown in FIG. 5 or FIG. 6 to obtain both of the fingerprint related image and the vein related image of the user.

A process for a multimodality implemented wearable device to obtain both a fingerprint image and a vein image of a user is described with reference to FIG. 8 as follows.

Although FIG. 8 shows that an infrared light projection unit 830 and a white light projection unit 825 are provided as different layers for clarity, such units 830 and 825 can be provided to a flexible surface light source, which belongs to the scope of the appended claims and their equivalents.

The wearable device according to another embodiment of the present invention obtains user's vein image 860 through a first photo panel 845 and also obtains user's fingerprint image 855 through a second photo panel 835.

Meanwhile, the wearable device according to another embodiment of the present invention can be set to require the fingerprint image 855, the vein image 860, or both of the fingerprint image 855 and the vein image 860 according to a security level required for each function.

For instance, in order to perform a function (e.g., a cost payment, an e-commerce, etc.) that requires a high security level, both of the fingerprint image 855 and the vein image 860 of the user can be set to be inputted. And, in order to perform a function (e.g., a music listening, a photo view, etc.) that requires a relatively low security level, one of the fingerprint image 855 and the vein image 860 of the user can be set to be inputted [cf. Table 1]. Security levels (LEVELs 0 to 2) are exemplarily shown in Table 1. A user can set different security levels, which belongs to the scope of the appended claims and their equivalents.

TABLE 1

| | Function | Vein image | Fingerprint image |
|---|---|---|---|
| LEVEL 0 | Photo view | Not required | Required |
| LEVEL 1 | Mail, Schedule check | Required | Not Required |
| LEVEL 2 | Bank job | Required | Required |

Meanwhile, a biometric authentication device applied wearable device according to one embodiment of the present invention can be configured to be capable of wireless communications in order to perform the aforementioned various functions such as cost payment, e-commerce, music listening, web surfing, etc. For instance, the wearable device according to one embodiment of the present invention may include an antenna for wireless communications in the body 101 of FIG. 1, the body 415 of FIG. 4, or the body 715 of FIG. 7.

Figure 9:
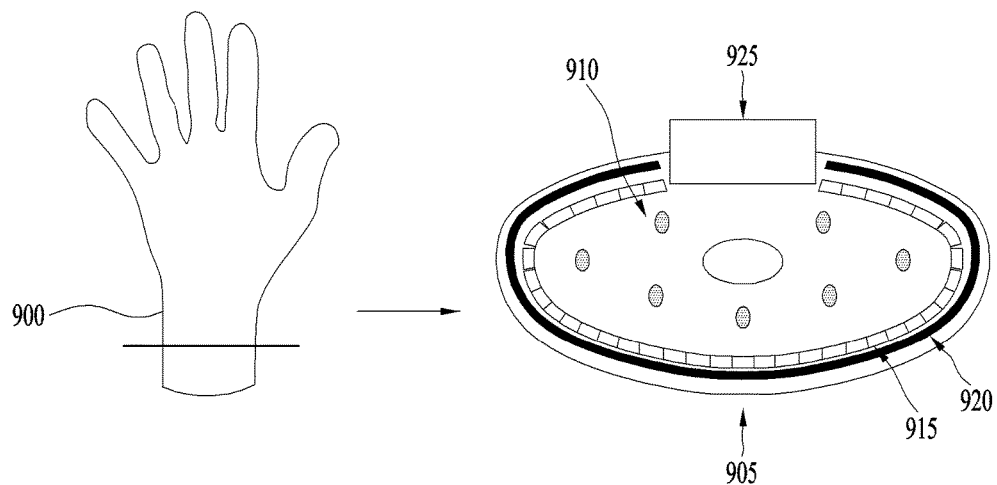
FIG. 9 is a diagram to show the principle for a wearable device according to further embodiment of the present invention to obtain user's 3D vein image.

FIG. 9 is a diagram to show the principle for a wearable device according to further embodiment of the present invention to obtain user's 3D vein image.

According to a cross-sectional diagram 905 of a band-type wearable device worn on a hand 900 of a user, a flexible surface light source 920 and a photo panel 915 can be continuously provided along an inner surface of a band in the band-type wearable device. For instance, the photo panel 915 may include a flexible TFT photo panel.

Under the control of a controller provided to a main body 925, the flexible surface light source 920 projects an infrared light and the photo panel 915 can detect a 3D vein image of the user.

Figure 10:
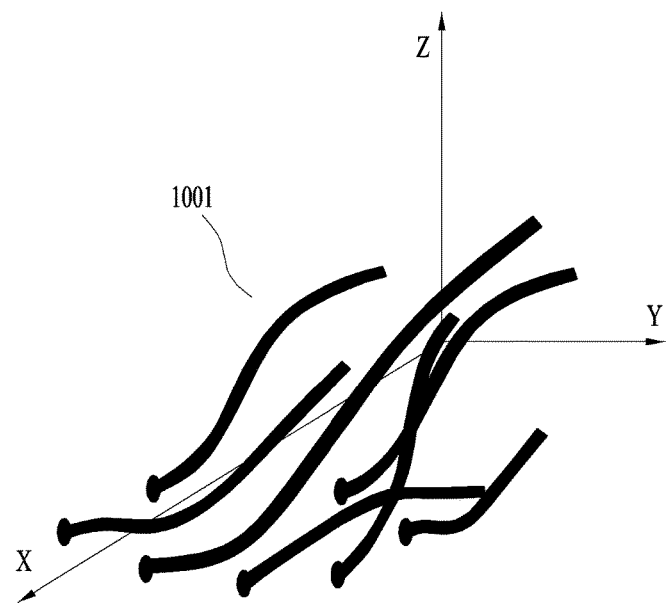
FIG. 10 is a diagram of the 3D vein image obtained by the principle shown in FIG. 9.

FIG. 10 is a diagram of the 3D vein image obtained by the principle shown in FIG. 9.

A vein authentication device of the related art obtains a 2D vein image of a portion of user's body by reflective or transmissive photography. Yet, regarding a wearable device according to further embodiment of the present invention, the photo panel 915 is continuously provided along the inner surface of the band, it is able to obtain a 3D vein image of user's wrist.

According to the vein authentication technology of the related art, if a user's body is wounded, it is difficult to obtain an accurate image. And, due to vasoconstriction at a considerably low temperature, it may be difficult to obtain a clear image. According to further embodiment of the present invention mentioned in the foregoing description, since images are taken along a wrist circumference, it is possible to obtain blood vessel pattern information larger than a 2D vein image, user authentication can be achieved in case of a wounded body of a user or a considerably low temperature.

Figure 11:
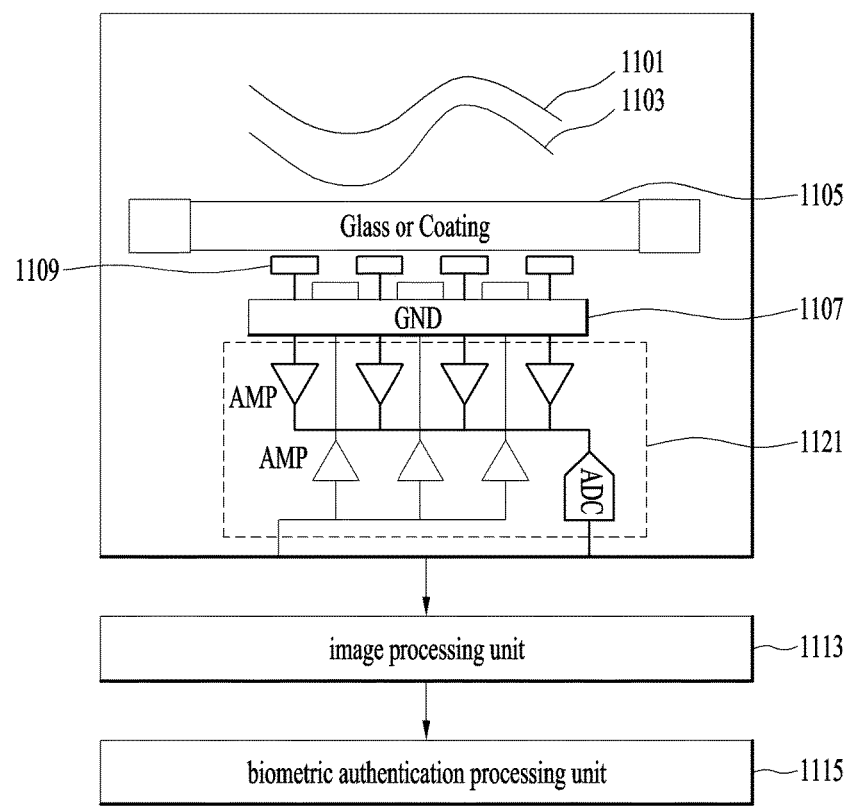
FIG. 11 is a diagram for an internal configuration of a wearable device to implement one embodiment, another embodiment, or further embodiment of the present invention.

FIG. 11 is a diagram for an internal configuration of a wearable device to implement one embodiment, another embodiment, or further embodiment of the present invention.

Referring to FIG. 11, while a user's skin 1103 comes into contact with a photo panel (not shown) through a protective panel 1105 directly or indirectly, a controller (not shown) controls a sensing timing of a transmitter 1107 so that a receiver 1109 can scan a vein 1101 of the user. The sensing timing determines whether the receiver 1109 can obtain a biometric image with predetermined frames per second. An analogue-digital converter (ADC) provided to an ROIC (readout IC) 1121 generates unprocessed data by digitalizing the user's scanned vein image. The generated unprocessed data is transmitted to an image processing unit 1113. The image processing unit 1113 generates processed data through a data post-processing such as image quality enhancement, image processing and the like and then transmits the processed data to a biometric authentication processing unit 1115. The biometric authentication processing unit 1115 saves the processed data to a memory (not shown) or performs a user authentication function by comparing the processed data to a stored biometric image.

The controller and other components in the system shall be described in detail with reference to FIG. 12. Yet, it is able to implement another embodiment by modifying or deleting at least one of modules shown in FIG. 12, which belongs to the scope of the appended claims and their equivalents. And, it is apparent that the scope of the appended claims and their equivalents should be basically confirmed according to the matters disclosed in the appended claims.

Meanwhile, a wearable device according to implement one embodiment, another embodiment, or further embodiment of the present invention can set various references when user's biometric image is initially registered. For instance, when a user intends to set different security levels for a function performed on a device, a fingerprint image and a vein image of the user can be set to be registered together, or one of the fingerprint image and the vein image can be set to be registered only. Regarding the fingerprint image, a fingerprint can be registered per finger. And, a different function can be set to be performed on a wearable device according to each registered finger. Namely, it is advantageous in that a user can set a user authentication scheme for performing a function on a wearable device freely in various ways.

Figure 12:
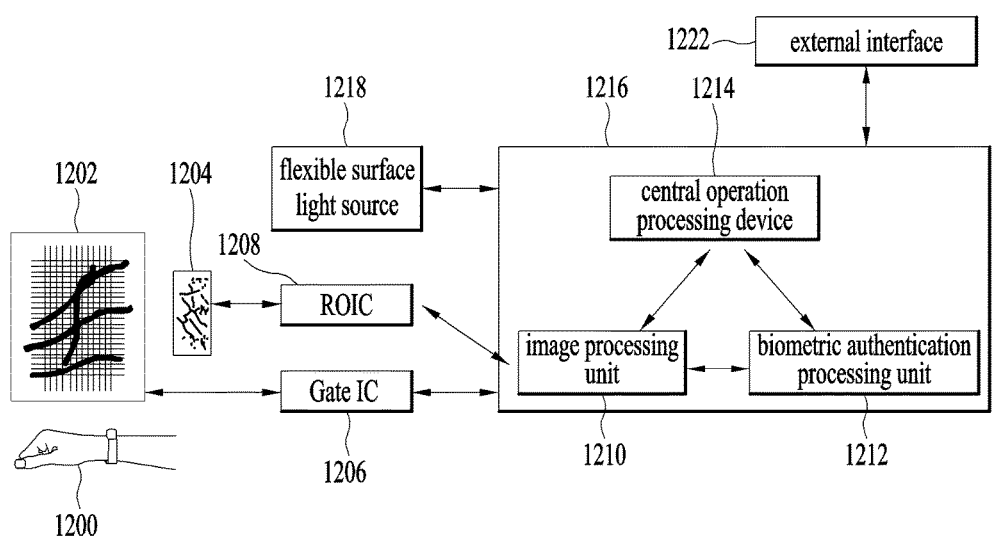
FIG. 12 is a diagram for details of a combined relation between the component shown in FIG. 11 and the component of a controller.

FIG. 12 is a diagram for details of a combined relation between the component shown in FIG. 11 and the component of a controller.

A configuration of a controller of a wearable device according to one embodiment of the present invention and a process for the controller to control other components for obtaining a biometric image are described with reference to FIG. 12 as follows.

First of all, a controller 1216 may be provided by including a central operation processing device 1214, an image processing unit 1210 and a biometric authentication processing unit 1212. Although FIG. 12 shows that the controller is configured with the three components, the controller can be designed into a single module, which belongs to the scope of the appended claims and their equivalents. And, the controller is capable of wireless communication with an external interface 1222 through an antenna (not shown).

The controller 1216 controls a sensing timing of a flexible surface light source 1218 and a photo panel 1202 and generates a synchronization drive signal of an ROIC 1208 and a Gate IE 1206. Once the synchronization drive signal is generated, the photo panel 1202 obtains user's biometric image 1204 from a body 1200 of the user. The user's biometric image 1204 is transmitted to the ROIC 1208.

A data processing, a registration processing and an authentication processing by the image processing unit 1210 and the biometric authentication processing unit 1212, which are the components of the controller 1216, can be understood through the former description with reference to FIG. 11.

Figure 13:
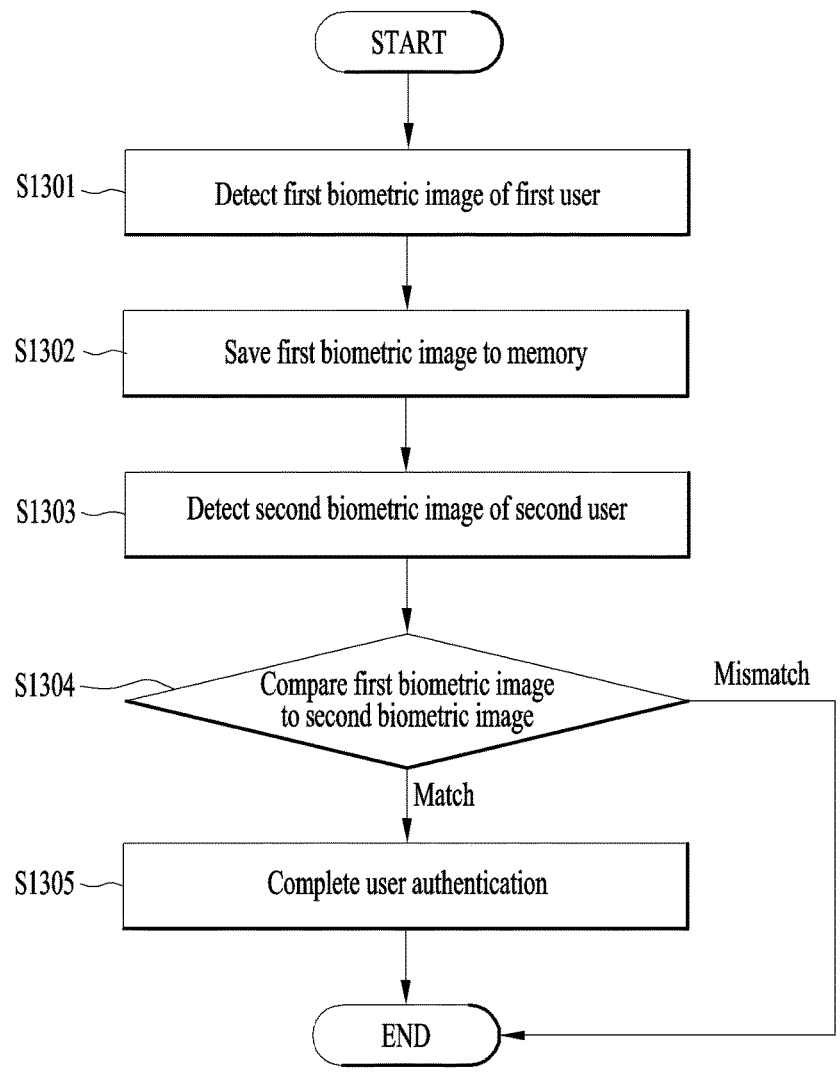
FIG. 13 is a flowchart for a method of controlling a wearable device to implement one embodiment, another embodiment, or further embodiment of the present invention.

FIG. 13 is a flowchart for a method of controlling a wearable device to implement one embodiment, another embodiment, or further embodiment of the present invention.

Referring to FIG. 13, a wearable device according to one embodiment of the present invention detects a first biometric image of a first user [S1301].

The wearable device according to one embodiment of the present invention saves the detected first biometric image to a memory [S1302].

The wearable device according to one embodiment of the present invention detects a second biometric image of a second user [S1303].

A controller of the wearable device according to one embodiment of the present invention compares the first biometric image saved to the memory with the detected second biometric image [S1304].

If the first biometric image matches the second biometric image, the controller of the wearable device according to one embodiment of the present invention completes a user authentication [S1305].

Meanwhile, the wearable device according to one embodiment of the present invention may include a separate vibration device and the like provided to the main body unit 715 shown in FIG. 7. If the first biometric image and the second biometric image fail to match each other, the vibration device or the like can be set to output a vibration message indicating a failure of the user authentication. Through this, a user can instantly recognize the failure of the user authentication.

Terminologies used for the present invention are defined in consideration function in the present invention and may vary according to intentions, practices and the like of technicians working in the corresponding fields. Hence, the definitions should be made based on the overall contents of the present invention.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include a controller of a wearable device. It will be appreciated by those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A wearable device, comprising:
   a memory;
   a flexible surface light source;
   a photo panel located on a top surface of the flexible surface light source; and
   a controller coupled with the flexible surface light source and the photo panel,
   wherein the controller is configured to detect a first biometric image by controlling the flexible surface light source and identify a user by comparing the detected first biometric image to a second biometric image previously saved in the memory,
   wherein the flexible surface light source further comprises:
      at least one or more infrared or white light projection units arranged sequentially; and
      a reflective unit located on one side of the flexible surface light source in a direction parallel with the flexible surface light source to project at least one of an infrared light and a white light in a direction vertical to the flexible surface light source, and
   wherein the flexible surface light source is configured to selectively project at least one of the infrared light and the white light under a control of the controller.

2. The wearable device of claim 1, wherein the first biometric image is detected when the photo panel and one of body parts of the user come into contact with each other directly or indirectly.

3. The wearable device of claim 1, wherein the controller controls the flexible surface light source to project the infrared light to obtain a vein image and wherein the controller controls the flexible surface light source to project the white light to obtain either a fingerprint image or a palm image.

4. The wearable device of claim 1, wherein the photo panel comprises a first photo panel located on the top surface of the flexible surface light source and a second photo panel located on a bottom surface of the flexible surface light source and wherein the first photo panel, the flexible surface light source and the second photo panel are stacked in order.

5. The wearable device of claim 4, wherein the controller controls the flexible surface light source to project the infrared light and the white light together and wherein the photo panel obtains a vein image through the first photo panel and also obtains either a fingerprint image or a palm image through the second photo panel.

6. The wearable device of claim 1, wherein the wearable device comprises a band configured to be worn on a wrist of the user and wherein the photo panel detects a 3-dimensional (3D) vein image under the control of the controller in a manner that the flexible surface light source and the photo panel are provided along an inner surface of the band.

7. The wearable device of claim 1, wherein the controller is configured to require either a vein image or both the vein image and a fingerprint image according to a security level required per function of the wearable device.

8. The wearable device of claim 1, wherein the wearable device comprises a ring and wherein the photo panel comprises a thin film transistor (TFT) panel.

* * * * *